(12) United States Patent
Satou et al.

(10) Patent No.: US 12,517,392 B2
(45) Date of Patent: Jan. 6, 2026

(54) DISPLAY DEVICE

(71) Applicant: Nissan Motor Co., Ltd., Yokohama (JP)

(72) Inventors: Fuminori Satou, Kanagawa (JP); Yoshimi Ohta, Kanagawa (JP); Maki Shimada, Kanagawa (JP); Ryouta Maehashi, Kanagawa (JP); Shunta Nabetani, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/872,305

(22) PCT Filed: Apr. 21, 2023

(86) PCT No.: PCT/JP2023/015899
§ 371 (c)(1),
(2) Date: Dec. 6, 2024

(87) PCT Pub. No.: WO2023/243223
PCT Pub. Date: Dec. 21, 2023

(65) Prior Publication Data
US 2025/0264753 A1    Aug. 21, 2025

(30) Foreign Application Priority Data
Jun. 13, 2022    (JP) ................. 2022-095101

(51) Int. Cl.
*G02F 1/1335*    (2006.01)
*G02F 1/1347*    (2006.01)

(52) U.S. Cl.
CPC .... *G02F 1/133514* (2013.01); *G02F 1/13475* (2013.01); *G02F 2203/10* (2013.01)

(58) Field of Classification Search
CPC ................................................. G02F 1/13475
See application file for complete search history.

(56) References Cited

U.S. PATENT DOCUMENTS

| 2003/0063245 A1* | 4/2003 | Bowley | G02F 1/133536 349/115 |
| 2012/0194934 A1* | 8/2012 | Kitson | G02B 5/0284 29/428 |

(Continued)

FOREIGN PATENT DOCUMENTS

| JP | 7-43660 A | 2/1995 |
| JP | 2006-526810 A | 11/2006 |

(Continued)

*Primary Examiner* — Jessica M Merlin
(74) *Attorney, Agent, or Firm* — GLOBAL IP COUNSELORS, LLP

(57) ABSTRACT

The display device includes an image display body whose optical state changes between a transparent state and an opaque screen state, and an image projection unit that projects visible light onto the image display body in the screen state to display an image. The image display body includes a display function layer having liquid-crystal molecules and a photoresponsive alignment change-inducing material, and a reflective layer laminated on the display function layer. The reflective layer has a reflection peak wavelength within 10% of the maximum absorption peak wavelength of the photoresponsive alignment change-inducing material, and the reflectance is 10% or less in the wavelength range of 100 nm or more from the reflection peak wavelength.

10 Claims, 2 Drawing Sheets

(56) References Cited

U.S. PATENT DOCUMENTS

| | | | |
|---|---|---|---|
| 2016/0116795 A1* | 4/2016 | Son | G02F 1/136286 |
| | | | 438/30 |
| 2016/0202178 A1* | 7/2016 | Acosta | G02B 21/0064 |
| | | | 356/302 |
| 2019/0292456 A1 | 9/2019 | Yoon et al. | |
| 2021/0111668 A1 | 4/2021 | Sonwalker | |

FOREIGN PATENT DOCUMENTS

| | | |
|---|---|---|
| JP | 2013-159569 A | 8/2013 |
| JP | 2018-185511 A | 11/2018 |
| JP | 2021-26184 A | 2/2021 |

* cited by examiner

DISPLAY DEVICE

CROSS-REFERENCE TO RELATED APPLICATIONS

This application is a U.S. national stage application of International Application No. PCT/JP2023/015899, filed on Apr. 21, 2023, which claims priority to Japanese Patent Application No. 2022-095101.

BACKGROUND

Technical Field

The present invention relates to a display device, and more specifically to a display device having an image display body, the optical state of which changes between a transparent state and an opaque screen state.

Background Information

A display device that has an image display body, the optical state of which changes between a transparent state and a non-transparent screen state, and an image projection unit (projector) that projects visible light onto the above-mentioned image display body in a screen state to display an image is known from the prior art.

Japanese Unexamined Patent Application Publication No. 2018-185511 (hereinafter referred to as Patent Document 1) discloses a display device in which a display function layer of the image display body contains liquid-crystal molecules and a photoresponsive alignment change-inducing material, that when irradiated with ultraviolet light increases the light scattering property of the image display body and changes the image display body to a non-transparent screen state, and that when irradiated with visible light of a specific wavelength returns the image display body to a transparent state.

When exposed to ultraviolet light, the photoresponsive alignment change-inducing material changes from the trans isomer to the cis isomer, the bent molecular structure of the cis isomer disrupting the alignment of the liquid-crystal molecules, thereby increasing the light scattering property of the display function layer; and when exposed to visible light of a specific color, the cis isomer changes to the trans isomer, and the liquid-crystal molecules, disrupted in alignment, realign and return the display function layer to the transparent state.

SUMMARY

However, in the image display body described in Patent Document 1, the photoresponsive alignment change-inducing material that undergoes changes in optical state absorbs light of specific wavelengths in the visible light spectrum, thus causing some of the light projected from the image projection unit onto the image display body in the screen state to be absorbed.

Therefore, the intensity balance of the light scattered by the image display body changes, such that the color of an image projected from the image projection unit and the color of the image displayed on the image display body will differ.

The present invention was devised in view of these problems of the prior art and has as an object to provide a display device having an image display body that can prevent degradation of color reproducibility of images displayed on the image display body.

As a result of extensive study to achieve the aforementioned object, the present inventors discovered that the aforementioned object could be realized by providing a reflective layer that selectively reflects light within the wavelength range that is absorbed by the photoresponsive alignment change-inducing material, thereby completing the present invention.

Specifically, the display device of the present invention comprises an image display body whose optical state changes between a transparent state and an opaque screen state, and an image projection unit that projects visible light onto the image display body in the screen state to display an image. Further, the image display body includes a display function layer having liquid-crystal molecules and a photoresponsive alignment change-inducing material, and a reflective layer laminated on the display function layer, wherein the reflective layer has a reflection peak wavelength within ±70 nm of the maximum absorption peak wavelength of the photoresponsive alignment change-inducing material, and the reflectance is 10% or less in the wavelength range greater than 100 nm from the reflection peak wavelength.

According to the present invention, a display device can be provided that prevents degradation of the color reproducibility of an image projected onto the image display body by means of a reflective layer that selectively reflects light within the absorption wavelength range of the photoresponsive alignment change-inducing material.

BRIEF DESCRIPTION OF THE DRAWINGS

Referring now to the attached drawings which form a part of this original disclosure, selected embodiments are illustrated.

DETAILED DESCRIPTION OF EMBODIMENTS

The display device of the present invention will now be described in detail. The display device of the present invention is provided with an image display body 1 and an image projection unit 2, and, if necessary, a control light projection unit 3 that controls the optical state of the image display body 1.

Figure 1:
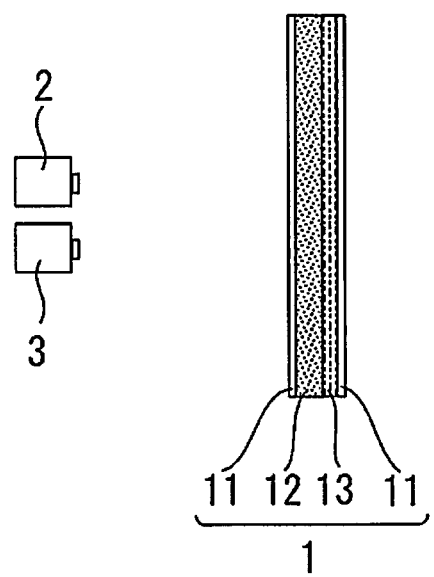
FIG. 1 is a schematic diagram showing an example of the display device of the present invention.

As shown in FIG. 1, the image display body 1 comprises a display function layer 12, the optical state of which changes between a transparent state and an opaque screen state, interposed between two transparent substrates 11, and a reflective layer 13 laminated on the display function layer 12.

The display function layer contains liquid-crystal molecules and a photoresponsive alignment change-inducing material between two vertical alignment films, wherein the alignment state of the liquid-crystal molecules changes, thereby changing the light scattering state, in accordance with changes in the molecular structure of the photoresponsive alignment change-inducing material due to ultraviolet light or visible light.

As described above, the photoresponsive alignment change-inducing material absorbs not only ultraviolet light but also light of some wavelengths of the visible light spectrum, thereby causing some wavelengths of the visible light projected from the image projection unit onto the image display body in the screen state to be absorbed.

Therefore, in the display function layer, the reflection intensity of some wavelengths of light decreases, while the reflection intensity of other wavelengths does not decrease, and thus, the color of the image projected by the image projection unit differs from the color of the image displayed on the image display body solely due to the display function layer, which makes accurate color reproduction of the displayed image on the image display body impossible.

In the image display body of the present invention, the reflective layer, which is laminated on the display function layer, acts as a dichroic mirror that reflects light of specific wavelengths and transmits light of other wavelengths.

The reflective layer has reflection properties such that the reflection peak wavelength is within ±70 nm of the maximum absorption peak wavelength of the photoresponsive alignment change-inducing material, and the reflectance is 10% or less in the wavelength range 100 nm or more from the reflection peak wavelength.

In other words, the reflective layer selectively reflects light in the wavelength range absorbed by the photoresponsive alignment change-inducing material and transmits light of other wavelength ranges to the opposite side without reflection.

Therefore, of the visible light projected from the image projection unit, the light in the wavelength range absorbed by the photoresponsive alignment change-inducing material is absorbed by the display function layer, thereby attenuating the scattering intensity, while in the reflective layer, this light is reflected back toward the image projection unit, thereby increasing the intensity of the light directed toward the image projection unit.

Moreover, light outside of the wavelength range that is absorbed by the photoresponsive alignment change-inducing material is not absorbed by the display function layer, thus not attenuating the scattering intensity, but is transmitted through the reflective layer, thereby attenuating the intensity of the light directed toward the image projection unit.

Thus, in the image display body of the present invention, the display function layer and the reflective layer are laminated so that the absorption of light by the photoresponsive alignment change-inducing material in the display function layer is offset by the reflection of light in the reflective layer, and thus, when the image display body is viewed from the image projection unit side, the intensity of visible light across the spectrum is made uniform, thereby improving color reproducibility.

Further, the reflectance in the wavelength range of 100 nm or more from the reflection peak wavelength is 10% or less, and the reflection characteristics are sharp, meaning that light outside the wavelength range absorbed by the photoresponsive alignment change-inducing material is unaffected; it is thus possible to design without considering reflection of light outside the above wavelength range.

In addition, the half-width of the reflection peak of the reflection spectrum of the reflective layer is narrower than the half-width of the absorption peak of the absorption spectrum of the photoresponsive alignment change-inducing material, and the reflection characteristics are sharp, so that not all light in the wavelength range absorbed by the photoresponsive alignment change-inducing material is reflected. Therefore, even if the reflective layer is disposed closer to the control light projection unit than the display function layer, the optical state of the display function layer can still be controlled, thereby enhancing the degree of freedom of design.

If the image projection unit is a light source that emits monochromatic light, the peak wavelength of this monochromatic light is preferably within ±20 nm of the reflection peak wavelength of the reflective layer.

In general, visible images are displayed using a combination of monochromatic light of three colors: red (R), green (G), and blue (B), and a decrease in color reproducibility occurs when the peak wavelength of any of these monochromatic lights falls within the wavelength range absorbed by the photoresponsive alignment change-inducing material, resulting in a reduction in the light intensity of that monochromatic light alone.

Therefore, the reflective layer need not reflect all of the light in the wavelength range absorbed by the photoresponsive alignment change-inducing material, but need only reflect the monochromatic light of a color whose light intensity is reduced due to absorption by the photoresponsive alignment change-inducing material.

Since the reflection peak wavelength of the reflective layer is within ±20 nm of the peak wavelength of the monochromatic light absorbed by the photoresponsive alignment change-inducing material, even if the peak wavelength of the monochromatic light emitted by the light source shifts due to heat, etc., the monochromatic light of a color whose light intensity is reduced can be reliably reflected, thereby preventing a decrease in color reproducibility.

The light sources for the image projection unit that emits monochromatic light can include white LEDs that use color filters to produce monochromatic light of each RGB color, LEDs or semiconductor lasers that uses elements dedicated to each RGB color, and devices that generate green and red light through color conversion using fluorescent materials from blue light.

The image display body is preferably such that when the light source emits a plurality of monochromatic light of different wavelengths, it is preferable that the difference in diffuse reflectance at the peak wavelength of each monochromatic light be 10% or less.

By adjusting the reflectance of the reflective layer according to the thickness of the display function layer and the concentration of the photoresponsive alignment-change inducing material, i.e., the absorption rate of the display function layer, and by keeping the difference in the diffuse reflectance at the peak wavelength of each monochromatic light of the image display body to 10% or less, the variation in the light intensity of each monochromatic light scattered toward the image projection unit can be reduced and color reproduction improved.

Examples of the above-mentioned reflective layer include multilayer dielectric films with different refractive indices, reflective diffraction gratings, and a plasmon resonance reflection films.

The above-mentioned multilayer dielectric thin films with different refractive indices can be fabricated by laminating dielectric thin films using sputtering or electron beam evaporation deposition. The reflection peak wavelength can be adjusted by adjusting the film thicknesses in accordance with the refractive indices of the dielectric films, specifically, by adjusting the film thickness to a quarter of the wavelength to be reflected divided by the refractive index, and the reflection intensity can be adjusted as a function of the number of layers.

The above-mentioned reflective diffraction grating can be fabricated using photolithography or ion beam etching. The reflection peak wavelength and reflectance can be adjusted by changing the spacing and depth of the slits.

The plasmon resonance reflection film can be formed by uniformly arranging nanoparticles on a transparent substrate, the reflection peak wavelength can be adjusted according to the particle size of the nanoparticles, and the reflectance can be adjusted according to the quantity of the nanoparticles.

The above-mentioned reflective layer may be laminated in contact with the display function layer or via transparent substrates that hold the display function layer in place. However, since reflective diffraction gratings have geometric irregularities, it is preferable that the reflective diffraction grating, and the display function layer be laminated via transparent substrates to prevent the display function layer (especially the liquid-crystal molecules) from becoming cloudy.

In particular, unlike normal specular reflection in which the reflection angle of the image light is geometrically determined based on the angle of incidence, reflective diffraction gratings have the capability of changing the reflection angle, thus allowing high degree of freedom in the layout of the relative positions of the projector, image display body, and driver. Further, since the plasmon resonance reflection film has a diffuse reflection function, the plasmon resonance reflection film has a wide viewing angle, thereby improving visibility when viewed from various angles, and is therefore particularly suitable for use in image display bodies installed at an angle, such as in automobile windshields.

Moreover, as mentioned above, since the reflection characteristics of the reflective layer are sharp, the reflective layer can be laminated either on the image projection unit side of the display function layer or on the side opposite the image projection unit; however, due to the scattering effect of the display function layer, which can achieve a wider viewing angle, it is preferred that the reflective layer be laminated on the side opposite the image projection unit.

The above-mentioned liquid-crystal molecules can be nematic liquid crystals that have a rigid mesogenic skeleton and flexible long-chain alkyl groups and that exhibit optical and dielectric anisotropy. These nematic liquid crystals have the property of aligning in an essentially constant direction by aggregating rod-shaped liquid crystal molecules in the absence of external voltage.

Further, for the photoresponsive alignment change-inducing material, compounds can be used that absorb ultraviolet or visible light and undergo cis-trans isomerization can be used. Examples include compounds that have an azobenzene structure in which two benzene rings are bonded through an azo group, chalcone derivatives, sulfoxide compounds, fulgide compounds, and cinnamic acid compounds, etc.

It is preferred that the photoresponsive alignment change-inducing material be used in combination with a non-photoresponsive chiral compound that exhibits an optical rotation different than that of the photoresponsive alignment change-inducing material. By using the above-mentioned non-photoresponsive chiral compound in combination, the helical twisting powers (HTP) cancel each other out, further suppressing the disruption in the alignment of the liquid-crystal molecules caused by the twisting force of the trans isomer of the photoresponsive alignment change-inducing material.

Glass, resin, or the like can be used as the transparent substrate, and an ITO film or the like can be used as the transparent electrode for applying an electric field to the display function layer.

The image display body of the present invention may, if necessary, have an ultraviolet shielding layer on the side farther from the control light projection unit than the display function layer.

The ultraviolet shielding layer is a transparent film that contains an ultraviolet absorber or an ultraviolet light diffusing agent, and by providing this ultraviolet shielding layer, ultraviolet light that enters the display function layer from the side opposite the control light projection unit can be shielded, thereby preventing the display function layer from becoming cloudy due to sunlight or the like.

As the ultraviolet absorber, conventionally known ultraviolet absorbers that absorb ultraviolet light at wavelengths at or below 400 nm without absorbing visible light and have little coloration can be used, such as benzophenone derivatives, salicylate derivatives, triazole derivatives, and acrylonitrile derivatives. Further, examples of the ultraviolet light diffusing agent include titanium oxide and zinc oxide.

Moreover, the image display body of the present invention may, if necessary, have a light-modulating layer on the side farther from the control light projection unit than the display function layer. The light-modulating layer is a layer whose optical state changes between a transparent state and a colored state, and by changing the light-modulating layer to a colored state, the contrast of the image displayed on the display function layer can be enhanced, thereby improving visibility. One example of the above-mentioned optical functional layer is a layer containing a photochromic material.

The liquid-crystal optical element of the present invention can be used, for example, in automobile windshields or display windows, and can switch between a screen state that projects and displays visible light images and a transparent state in which the other side can be seen.

EMBODIMENTS

The present invention will be described in more detail with examples below, but the present invention is not limited to these examples.

Embodiment 1

A display function layer composition was prepared by mixing 83.75% by mass of liquid-crystal molecules (nematic liquid crystal: E44, manufactured by Merck), 5.1% by mass of a photoresponsive chiral (photoresponsive alignment change-inducing material, absorption peak wavelength: 440 nm) represented by the structural formula (1), 2.9% by mass of a non-photoresponsive chiral represented by the structural formula (2), 7.5% by mass of a polymerizable monomer represented by the structural formula (3), and 0.75% by mass of a photoinitiator (IRGACURE 819, manufactured by IGM Resins B. V.).

[Formula 1]

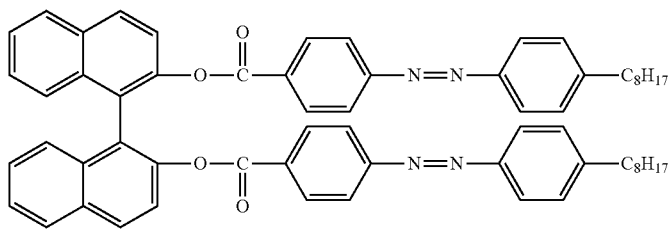

Structural Formula (1)

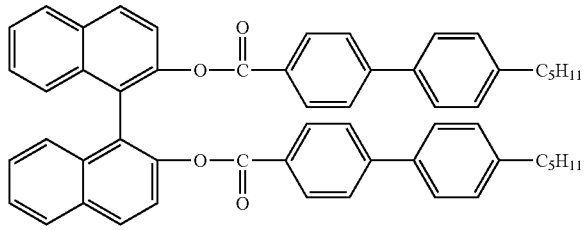

Structural Formula (2)

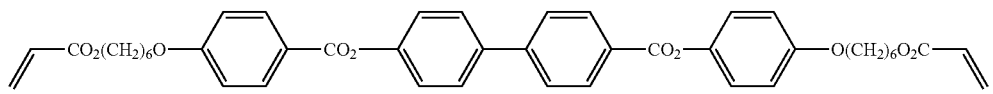

Structural Formula (3)

On one side of a transparent glass, a reflective layer consisting of 18 layers of dielectric was formed by alternately sputtering nine layers each of $CaF_2$ film having a thickness of 79 nm (refractive index 1.42) and $MgF_2$ film having a thickness of 81 nm (refractive index 1.387), and depositing a vertical alignment film (polyimide) over the entire surface.

The transparent glass on which the reflective layer was formed and a transparent glass on which only the vertical alignment film was formed on one side were arranged with the vertical alignment films facing inward, and the above-mentioned display function layer composition was injected between these transparent glasses to fabricate the image display body.

A display device was prepared by placing an image projection unit that emits three colors of monochromatic light with peak wavelengths of 450 nm (B), 550 nm (G), and 630 nm (R) on one side of the image display body and on the side on which the reflective layer is not formed.

A CM3600A spectrophotometer (manufactured by Konica Minolta) was used to measure the diffuse reflectance in the visible light region of the display function layer, the reflective layer, and the image display body, including both the display function layer and the reflective layer. The diffuse reflectance of the display function layer, the reflective layer, and the image display body are shown in FIGS. 2 to 4, respectively.

Figure 2:
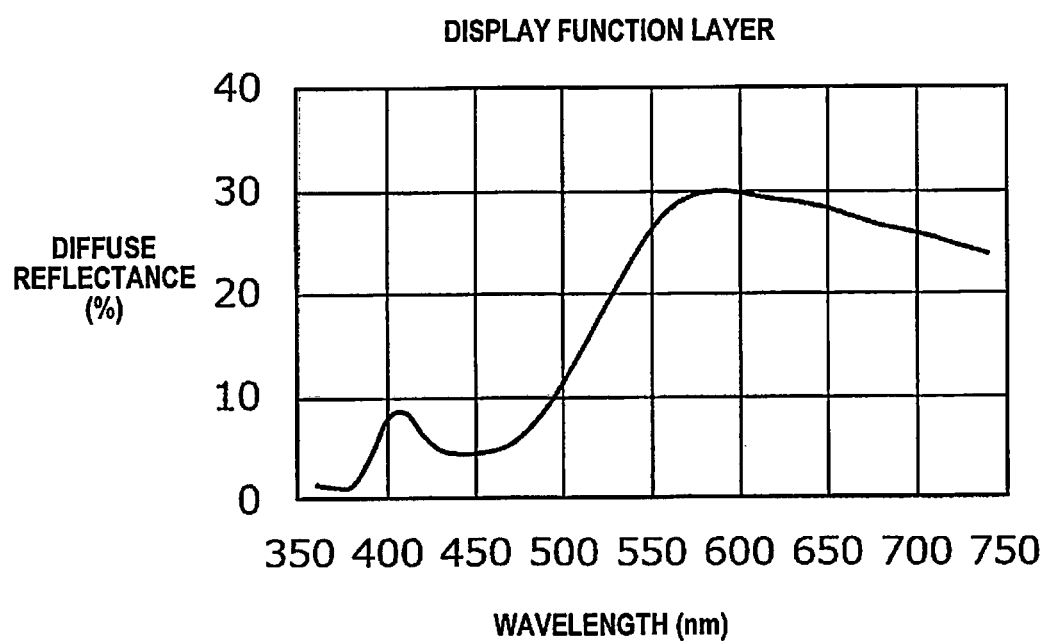
FIG. 2 is a graph showing the reflection spectrum of the display function layer according to an embodiment.
Figure 3:
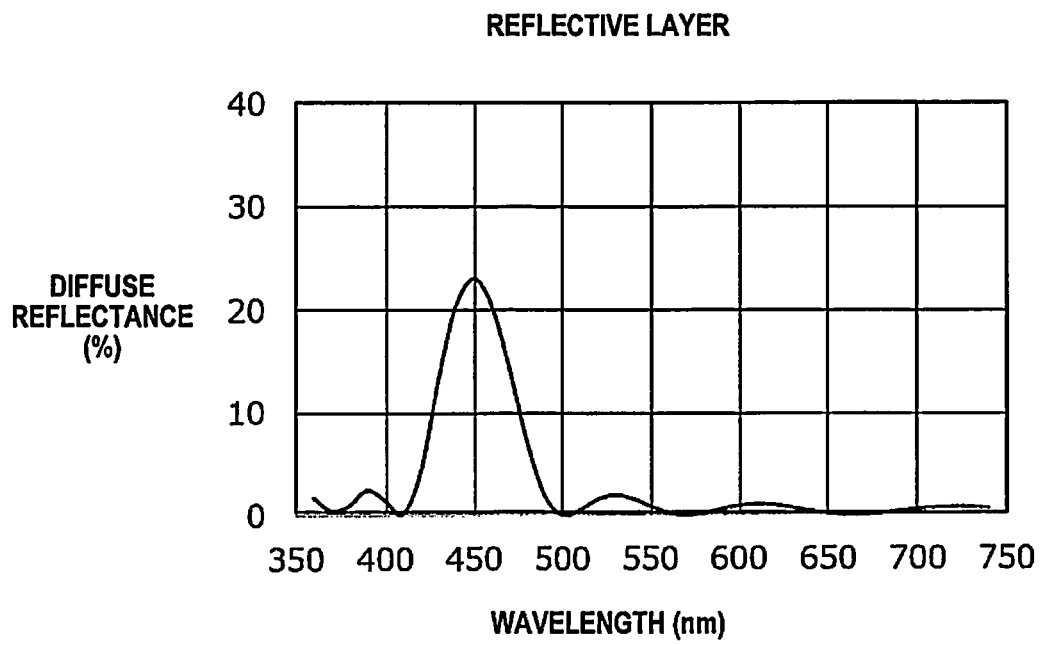
FIG. 3 is a graph showing the reflection spectrum of the reflective layer according to the embodiment.
Figure 4:
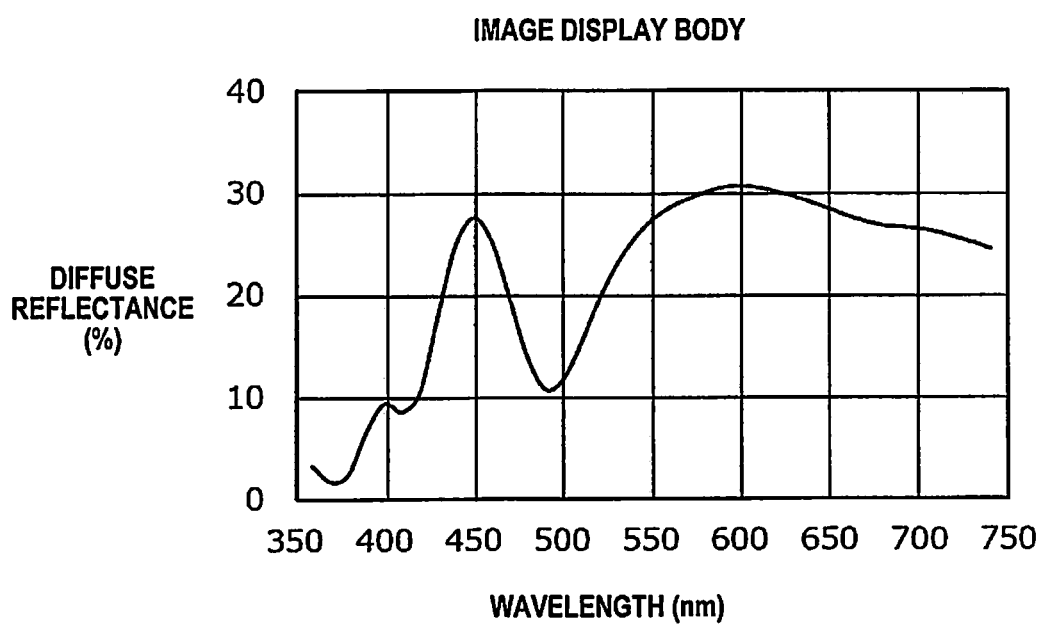
FIG. 4 is a graph showing the reflection spectrum of the image display body of the embodiment.

As shown in FIG. 2, the diffuse reflectance of the display function layer alone at 450 nm (B) was 5%, but the diffuse reflectance at 450 nm (B), 550 nm (G), and 630 nm (R) of the entire image display body, on which the reflective layer, which has a reflection peak wavelength at 450 nm (B) is laminated as shown in FIG. 3, was 28%, 28% and 30%, respectively, as shown in FIG. 4, thereby confirming that the three colors of light projected from the image projection unit are reflected almost equally, and indicating high color reproducibility.

The invention claimed is:
1. A display device comprising:
an image display body whose optical state changes between a transparent state and an opaque screen state; and
an image projection unit configured to project visible light onto the image display body in the screen state to display an image, wherein
the image display body includes a display function layer including liquid-crystal molecules and a photoresponsive alignment change-inducing material, and a reflective layer laminated on the display function layer,
the reflective layer has a reflection peak wavelength within ±70 nm of a maximum absorption peak wavelength of the photoresponsive alignment change-inducing material, and
the reflective layer has a reflectance of 10% or less in a wavelength range of 100 nm or more from the reflection peak wavelength.
2. The display device according to claim 1, wherein
the image projection unit includes a light source that emits monochromatic light, and
the reflection peak wavelength of the reflective layer is within ±20 nm of the peak wavelength of the monochromatic light within the absorption wavelength range of the photoresponsive alignment change-inducing material.
3. The display device according to claim 2, wherein
the light source is configured to emit a plurality of monochromatic lights of different wavelengths, and
a difference in a diffuse reflectance at the peak wavelength of each of the monochromatic light is 10% or less when the diffuse reflectance of the image display body is measured.
4. The display device according to claim 1, further comprising
a control light projection unit configured to project ultraviolet light to bring the image display body into the screen state, and the image display body has an ultraviolet shielding layer on a side farther from the control light projection unit than the display function layer.

5. The display device according to claim 4, wherein the image display body has a light-modulating layer on the side farther from the control light projection unit than the display function layer.

6. The display device according to claim 1, wherein the reflective layer includes multilayer dielectric thin films with different refractive indices.

7. The display device according to claim 1, wherein the reflective layer includes a reflective diffraction grating.

8. The display device according to claim 1, wherein the reflective layer includes plasmon resonance reflection films.

9. The display device according to claim 1, wherein the reflection peak wavelength of the reflective layer is a wavelength included in the visible light projected by the image projection unit.

10. The display device according to claim 1, wherein the reflective layer is configured to reflect light back toward the image projection unit.

* * * * *